US012009853B2

United States Patent
Paden (10) Patent No.: US 12,009,853 B2
(45) Date of Patent: Jun. 11, 2024

(54) RING ATTACHMENT FOR MOBILE DEVICE

(71) Applicant: Jason Richard Paden, Utica, NY (US)

(72) Inventor: Jason Richard Paden, Utica, NY (US)

(73) Assignee: Jason Richard Paden, Utica, NY (US)

( * ) Notice: Subject to any disclaimer, the term of this patent is extended or adjusted under 35 U.S.C. 154(b) by 0 days.

(21) Appl. No.: 17/290,810

(22) PCT Filed: Nov. 8, 2019

(86) PCT No.: PCT/US2019/060476
§ 371 (c)(1),
(2) Date: May 3, 2021

(87) PCT Pub. No.: WO2020/097465
PCT Pub. Date: May 14, 2020

(65) Prior Publication Data
US 2021/0409057 A1    Dec. 30, 2021

Related U.S. Application Data

(60) Provisional application No. 62/757,216, filed on Nov. 8, 2018.

(51) Int. Cl.
*H04B 1/3888* (2015.01)
*H04M 1/02* (2006.01)
(Continued)

(52) U.S. Cl.
CPC .......... *H04B 1/3888* (2013.01); *H04M 1/026* (2013.01); *H04M 1/04* (2013.01); *H04M 1/21* (2013.01)

(58) Field of Classification Search
CPC ...... H04B 1/3888; H04M 1/026; H04M 1/04; H04M 1/21; H04M 1/0279
See application file for complete search history.

(56) References Cited

U.S. PATENT DOCUMENTS

| 9,531,423 B2 | 12/2016 | Gordon |
| 2010/0222118 A1* | 9/2010 | Interdanato ............... A45F 5/00 455/575.6 |

(Continued)

FOREIGN PATENT DOCUMENTS

| CN | 204392352 U | 6/2015 |
| CN | 106888283 A | 6/2017 |

(Continued)

OTHER PUBLICATIONS

International Search Report and Written Opinion of the International Searching Authority for International Application No. PCT/US2019/060476 dated Apr. 9, 2020.

(Continued)

*Primary Examiner* — Yuwen Pan
*Assistant Examiner* — Fatuma G Sherif
(74) *Attorney, Agent, or Firm* — Heslin Rothenberg Farley & Mesiti P.C.

(57) ABSTRACT

A ring attachment for a mobile device assembly wherein the mobile device assembly further includes a mobile device and a mobile device case. The mobile device case has sidewalls defining an inner cavity sized to receive the mobile device therein. The ring attachment includes an anchor having a height, width and thickness. The height and the width are sized to fit within the inner cavity. The thickness is sized to fit between the inner cavity of the mobile device case and a back surface of the mobile device when the mobile device is secured within the inner cavity. A ring is secured to the anchor. The ring is sized to receive a finger of a user. The ring is comprised of a resilient material such that inner surfaces of the ring may be compressed together when squeezed and the ring may return to an original shape when released.

15 Claims, 7 Drawing Sheets

(51) Int. Cl.
*H04M 1/04* (2006.01)
*H04M 1/21* (2006.01)

(56) References Cited

U.S. PATENT DOCUMENTS

| | | |
|---|---|---|
| 2012/0217275 A1 | 8/2012 | Yu |
| 2013/0146635 A1* | 6/2013 | Hedrick .................... A45F 5/00 428/41.7 |
| 2013/0240578 A1 | 9/2013 | Yu |
| 2013/0240580 A1 | 9/2013 | Yu |
| 2013/0277992 A1* | 10/2013 | Senoff ....................... A45F 5/00 294/25 |
| 2016/0049983 A1 | 2/2016 | Ripka |
| 2018/0069580 A1 | 3/2018 | Harris-Johnson |
| 2018/0177284 A1* | 6/2018 | Zagorski ................. A45F 5/021 |
| 2018/0271265 A1* | 9/2018 | Brousseau ............... B25G 3/00 |
| 2018/0294830 A1* | 10/2018 | Osmanski ............... H04M 1/04 |

FOREIGN PATENT DOCUMENTS

| | | |
|---|---|---|
| KR | 200452680 Y1 | 3/2011 |
| KR | 20140006269 U | 12/2014 |
| KR | 20150001071 U | 3/2015 |
| KR | 101510422 B1 | 4/2015 |
| KR | 101510449 B1 | 4/2015 |
| KR | 20150105737 A | 9/2015 |
| KR | 101559317 B1 | 10/2015 |
| KR | 20190034437 A | 4/2019 |
| WO | 2013069846 A1 | 5/2013 |
| WO | 2017010155 A1 | 1/2017 |

OTHER PUBLICATIONS

International Preliminary Report on Patentability for International Application No. PCT/US2019/060476, dated May 11, 2021, 8 pages, International Bureau of WIPO.

\* cited by examiner

FIG. 11

RING ATTACHMENT FOR MOBILE DEVICE

CROSS REFERENCE TO RELATED APPLICATIONS

This application is a U.S. National Phase filing under 35 U.S.C. § 371 of International Application PCT/US2019/060476, filed Nov. 8, 2019, and published as WO 2020/097465 A1 on May 14, 2020. PCT/US2019/060476 claims priority from U.S. Provisional Application No. 62/757,216, filed Nov. 8, 2018. The entire contents of each of these prior applications are hereby incorporated herein by reference.

TECHNICAL FIELD

The present disclosure relates to mobile device attachments and cases. More specifically, the disclosure relates to a mobile device ring attachment, mobile device assembly with ring, and process for incorporation of the mobile device ring attachment into the mobile device assembly with ring. The ring serves to engage a mobile device user's finger to prevent accidental damage to a mobile device.

BACKGROUND

Mobile devices are ubiquitous in current society. The advent of smart devices and touchscreens have made mobile devices more and more susceptible to damage through unintentional ground impact when a user accidentally drops his or her mobile device. As a result, costly repairs to, or replacement of, a user's mobile device is a common occurrence after one or more such events.

Accessories such as protective cases protect mobile devices from damage due to accidental droppage. However, oftentimes the mobile device graphical user interface (GUI), such as a touchscreen, is left unprotected by a protective case and the electronic circuitry within the mobile device may still be damaged by the force of ground impact. Further, mobile devices may accidentally be dropped into an environment (body of water, storm drains, etc.), wherein the mobile device (and protective case) is lost and must be replaced at significant expense and trouble.

Accordingly, there is a need for an accessory to mobile devices that can prevent a mobile device from being dropped or lost even when a user loses his or her grip on the mobile device.

BRIEF DESCRIPTION

In a first aspect, the present disclosure offers advantages and alternatives over the prior art by providing an attachment for a mobile device assembly comprising an anchor and a ring. The anchor has a height and width sized to fit within an inner cavity of a mobile device case. The anchor has a thickness sized to fit between the inner cavity of the mobile device case and a back surface of the mobile device when the mobile device is secured within the inner cavity of the mobile device case. The ring is secured to the anchor and sized to receive a finger of a user. The ring is comprised of a resilient material such that inner surfaces of the ring may be compressed together when squeezed and the ring may return to an original shape when released.

In a second aspect, the present disclosure provides a mobile device assembly comprising a mobile device, a mobile device case, and a substantially circular ring. The mobile device includes a first bottom edge and a first top edge. The mobile device case includes a second bottom edge and a second top edge, wherein the second bottom edge of the mobile device case aligns with the mobile device first bottom edge when the mobile device is encased in the mobile device case. The second bottom edge of the mobile device case includes an aperture. The substantially circular ring is attached to a bottom edge of the mobile device assembly via a connector connected to an anchor that is sandwiched between the mobile device and the mobile device case. The connector traverses the aperture of the second bottom edge of the mobile device case. The substantially circular ring is substantially orthogonal to a plane parallel to a mobile device screen of the mobile device and is sized to receive a finger of a user.

In a third aspect, the present disclosure provides a mobile device case comprising a mobile device case having a first bottom edge and a first top edge. The first bottom edge of the mobile device case aligns with a mobile device second bottom edge when the mobile device is encased in the mobile device case. A substantially circular ring is attached to the first bottom edge of the mobile device case. The substantially circular ring is substantially orthogonal to a plane parallel to a mobile device screen of the mobile device when the mobile device is encased in the mobile device case. The substantially circular ring is sized to receive a finger of a user.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
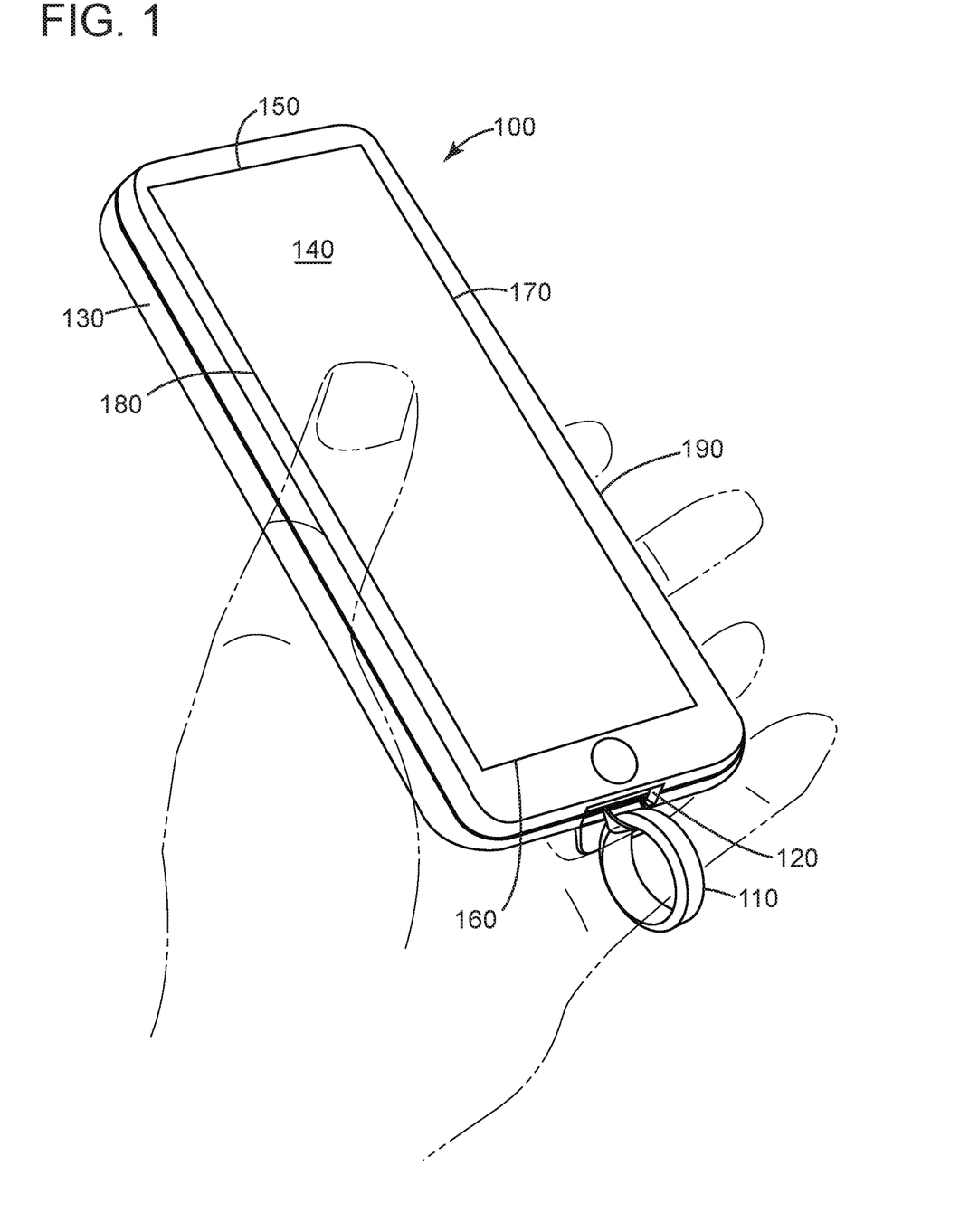
FIG. 1 depicts a perspective view of a mobile device assembly according to an exemplary embodiment of the present invention.

Referring to FIG. 1, a perspective view of a mobile device assembly 100 is depicted according to an exemplary embodiment of the present invention. Mobile device assembly 100 includes mobile device 190 and ring 110. In some embodiments, ring 110 protrudes from mobile device case 130 through bottom aperture 120. In some of these embodiments, aperture 120 also serves as an energy portal opening for mobile device 190. As depicted in FIG. 1, ring 110 receives a user's finger when said user grips mobile device assembly 100 thereby preventing damage through droppage should the user lose his or her grip on mobile device assembly 100. In an embodiment, ring 110 further includes an ornamental design (described more fully as ring 1110 in FIG. 11) for user enjoyment and personalization. Such ornamental designs include, but are not limited to: color, imprint, texturization, sculpted three-dimensional characters, etc.

Although FIG. 1 depicts ring 110 as engaging the user's little finger when the user is holding the mobile device assembly 100 for a portrait view of mobile device screen 140, other embodiments of the present invention include ring 110 engaging the user's other fingers depending on how the user decides to hold mobile device assembly 100. It is understood that a user's preference will dictate which of the user's fingers will engage ring 110 and those preferences may depend on factors such as the user's preferred way to grip mobile device assembly 100 when viewing mobile device screen 140 both in portrait mode or landscape mode. In general, ring 110 may engage any of the user's fingers in a variety of scenarios.

As used herein, "portrait mode," "portrait," etc. indicates that graphics displayed, pictures taken, etc. are viewed by the mobile device 190 user wherein the shorter edges of mobile device screen 140, i.e., screen edges 150 and 160, are the top and bottom boundaries, respectively, of the displayed graphic. In this mode of operation, the longer edges of mobile device screen 140, i.e., screen edges 170 and 180, are the right and left boundaries, respectively, of the displayed graphic.

As used herein, "landscape mode," "landscape," etc. indicates that graphics displayed, pictures taken, etc. are viewed by the mobile device 190 user wherein the longer edges of mobile device screen 140, i.e., screen edges 170 and 180, are the top or bottom boundaries of the displayed graphic. In this mode of operation, the shorter edges of mobile device screen 140, i.e., screen edges 150 and 160, are the right or left boundaries of the displayed graphic.

As used herein and when referring to mobile device assembly 100 and its features/components (i.e., mobile device case 130 and mobile device 190), "top" refers to edges of the rectangular mobile device case 130 and the rectangular mobile device 190 that are closest to screen edge 150. "Bottom" refers to edges of the rectangular mobile device case 130 and the rectangular mobile device 190 that are closest to screen edge 160. "First side" or "right side" refers to the edge of the rectangular mobile device case 130 and the rectangular mobile device 190 that are closest to screen edge 170. "Second side" or "left side" refers to the edge of the rectangular mobile device case 130 and the rectangular mobile device 190 that are closest to screen edge 180. Thus, as depicted in FIG. 1, aperture 120 and ring 110 reside at the bottom of mobile device assembly 100, mobile device case 130, and mobile device 190. In addition, the shown thumb of the user rests against the second side or left side of mobile device assembly 100, mobile device case 130, and encased mobile device 190. Further, as depicted in FIG. 1, the user's index, middle, and ring finger are partially seen protruding from the first side or right side of mobile device assembly 100, mobile device case 130, and encased mobile device 190. "Top," "bottom," "first side," "right side," "second side," and "left side" as defined in this paragraph apply to mobile device assembly 100 and its hardware features/components regardless of whether a user is viewing graphics in portrait or landscape mode as described above.

As used herein, "front side," "front face" or "front" refers to the side or portion of mobile device assembly 100 that includes mobile device screen 140. "back side" or "back" refers to the opposite side of mobile device assembly 100 from front side, front face or front, i.e., the side of mobile device assembly 100 that is in the most contact with the user's palm as depicted in FIG. 1.

In an embodiment, ring 110 is attached to mobile device assembly 100 via an anchor as described infra. In another embodiment, ring 110 is a permanent part of mobile device case 130, i.e., ring 110 and mobile device case 130 are manufactured as a mobile device case with a permanently attached ring, wherein mobile device 190 is optional. In yet another embodiment, ring 110 is a permanent part of the mobile device 190, i.e., ring 110 and mobile device 190 are manufactured as a mobile device with a permanently attached ring, wherein mobile device case 130 is optional. In embodiments where ring 110 is attached to mobile device assembly 100 via an anchor, the anchor may be adhered to mobile device 190, mobile device case 130, or both. In these embodiments, well-known methods of adhesion include adhesive glues, screws, etc. Alternatively, the anchor along with ring 110 may be attached and removed non-destructively by disassembling mobile device assembly 100 as described below. In this scenario, the anchor and ring 110 are secured because the anchor is sandwiched between mobile device 190 and an inner cavity of mobile device case 130 as described infra.

As shown in FIG. 1, embodiments of the present invention include a positioning of ring 110 that is substantially orthogonal to a plane of mobile device assembly 100 that is coplanar with mobile device screen 140, the front face of mobile device assembly 100, and the back side of mobile device assembly 100. In embodiments, ring 110 is substantially orthogonal to the plane of mobile device assembly 100 but is readily twisted to become substantially coplanar to the plane of mobile device assembly 100.

In some embodiments, ring 110 is comprised of a resilient material such that inner surfaces of ring 110 may be compressed together when squeezed and ring 110 may return to an original shape when released. In these embodiments, ring 110 may be composed of materials selected from one or more of the following non-limiting examples: natural rubber, synthetic rubber, nitrile rubber, silicone rubber, urethane rubber, chloroprene rubber, neoprene rubber, ethylene vinyl acetate rubber, isobutylene isoprene rubber, thermoplastic elastomer, chlorosulfonated polyethylene rubber, epichlorohydrin rubber, styrene butadiene rubber, thermoplastic vulcanizates rubber, ethylene propylene diene monomer rubber, natural gum, fluoropolymer elastomers, etc.

In some embodiments, ring 110 is comprised of a rigid material such that inner surfaces of the ring may not be compressed together without deforming or damaging the rigid ring. In these embodiments, ring 110 may be composed of materials selected from one or more of the following non-limiting examples: nylon, acrylic, polyvinyl chloride, polythene, polypropylene, polycarbonate, polyoxybenzylmethylenglycolanhydride, epoxy resin, melamine, metal, etc.

In some embodiments, ring 110 is a substantially circular ring. As used herein a "substantially circular ring" refers to a ring that has a substantially similar diameter regardless of where a line that traverses the ring center is drawn. In other words, any straight line that is drawn, which passes from a first inner border point of the ring to a second inner border point of the ring that also passes through a central point within the ring is substantially the same length no matter which first and second inner border point is chosen. In other embodiments, ring 110 has a non-circular shape such as oval-shaped, waterdrop shaped, square, triangle, etc.

In various embodiments, ring 110 varies in size depending on a user's finger thickness. For example, a user selects the size of ring 110 depending on factors such as ring size of one or more of the user's fingers. In an embodiment, ring 110 is adjustable by a user to suit user comfort and finger size requirement.

Figure 2:
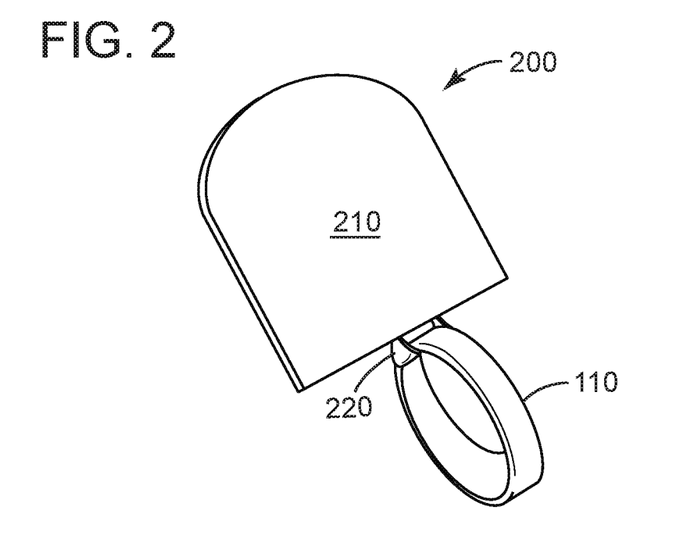
FIG. 2 depicts a perspective view of a first mobile device ring attachment according to an exemplary embodiment of the present invention.

Referring to FIG. 2, a perspective view of first ring attachment 200 is depicted according to an exemplary embodiment of the present invention. First ring attachment 200 includes anchor 210, ring 110, and ring-anchor connector 220.

In various embodiments, anchor 210 is composed of materials selected from one or more of the following non-limiting examples: wire, metal, plastic, silicone, rubber, wood, tape, fabric, laminated cardboard, etc.

Figure 3:
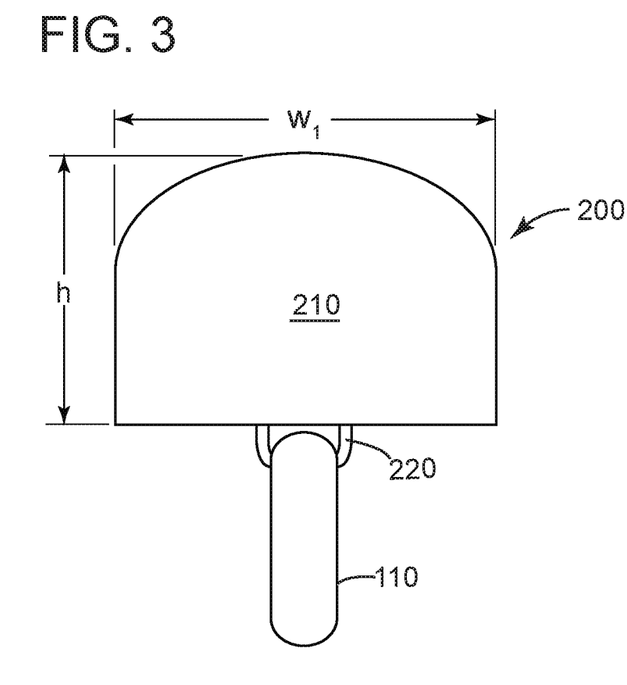
FIG. 3 depicts a top view of the first mobile device ring attachment according to an exemplary embodiment of the present invention.
Figure 4:
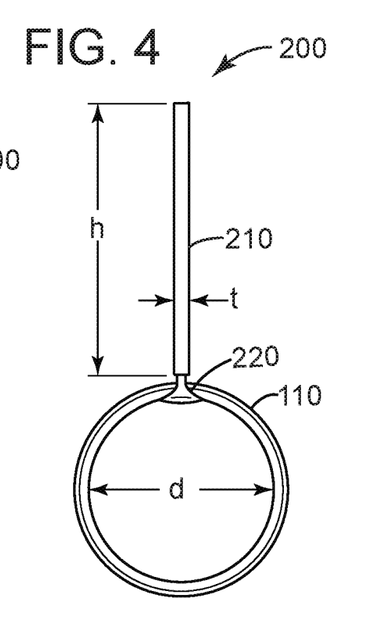
FIG. 4 depicts a side view of the first mobile device ring attachment according to an exemplary embodiment of the present invention.

Ring-anchor connector 220 employs any connection motif that serves to secure ring 110 to anchor 210. In an embodiment and as shown in FIGS. 2-4, ring-anchor connector 220 is a loop linking ring 110 to anchor 210. However, many other motifs are envisioned that would secure ring 110 to anchor 210 without departing from the scope of the present invention. In an embodiment, ring 110 and anchor 210 are molded together during manufacture out of one or more suitable compositions using materials as described above for ring 110 and anchor 110.

Referring to FIG. 3, a top view of first ring attachment 200 is depicted according to an exemplary embodiment of the present invention. In principle, height h of anchor 210 is any height accommodated within mobile device case 130 when first ring attachment 200 is installed as described below. In embodiments, height h ranges between approximately 0.5 inches to approximately 5 inches, approximately 0.5 inches to approximately 4.5 inches, approximately 0.5 inches to approximately 4 inches, approximately 0.5 inches to approximately 3.5 inches, approximately 0.5 inches to approximately 3 inches, approximately 0.5 inches to approximately 2.5 inches, approximately 0.5 inches to approximately 2 inches, approximately 0.5 inches to approximately 1.5 inches, approximately 0.5 inches to approximately 1 inch, approximately 1 inch to approximately 5 inches, approximately 1 inch to approximately 4.5 inches, approximately 1 inch to approximately 4 inches, approximately 1 inch to approximately 3.5 inches, approximately 1 inch to approximately 3 inches, approximately 1 inch to approximately 2.5 inches, approximately 1 inch to approximately 2 inches, approximately 1 inch to approximately 1.5 inches, approximately 1.5 inches to approximately 5 inches, approximately 1.5 inches to approximately 4.5 inches, approximately 1.5 inches to approximately 4 inches, approximately 1.5 inches to approximately 3.5 inches, approximately 1.5 inches to approximately 3 inches, approximately 1.5 inches to approximately 2.5 inches, approximately 1.5 inches to approximately 2 inches, approximately 2 inches to approximately 5 inches, approximately 2 inches to approximately 4.5 inches, approximately 2 inches to approximately 4 inches, approximately 2 inches to approximately 3.5 inches, approximately 2 inches to approximately 3 inches, approximately 2 inches to approximately 2.5 inches, approximately 1.5 inches to approximately 5 inches, approximately 1.5 inches to approximately 4.5 inches, approximately 1.5 inches to approximately 4 inches, approximately 1.5 inches to approximately 3.5 inches, approximately 1.5 inches to approximately 3 inches, approximately 1.5 inches to approximately 2.5 inches, approximately 1.5 inches to approximately 2 inches, approximately 2 inches to approximately 5 inches, approximately 2 inches to approximately 4.5 inches, approximately 2 inches to approximately 4 inches, approximately 2 inches to approximately 3.5 inches, approximately 2 inches to approximately 3 inches, approximately 2 inches to approximately 2.5 inches, approximately 2.5 inches to approximately 5 inches, approximately 2.5 inches to approximately 4.5 inches, approximately 2.5 inches to approximately 4 inches, approximately 2.5 inches to approximately 3.5 inches, approximately 2.5 inches to approximately 3 inches, approximately 3 inches to approximately 5 inches, approximately 3 inches to approximately 4.5 inches, approximately 3 inches to approximately 4 inches, approximately 3 inches to approximately 3.5 inches, approximately 3.5 inches to approximately 5 inches, approximately 3.5 inches to approximately 4.5 inches, approximately 3.5 inches to approximately 4 inches, approximately 4 inches to approximately 5 inches, approximately 4 inches to approximately 4.5 inches, and approximately 4.5 inches to approximately 5 inches.

In principle, width w of anchor 210 is any width accommodated within mobile device case 130 when first ring attachment 200 is installed as described below. In embodiments, width $w_1$ ranges between approximately 0.2 inches to approximately 3 inches, approximately 0.2 inches to approximately 2.5 inches, approximately 0.2 inches to approximately 2 inches, approximately 0.2 inches to approximately 1.5 inches, approximately 0.2 inches to approximately 1 inch, approximately 0.5 inches to approximately 3 inches, approximately 0.5 inches to approximately 2.5 inches, approximately 0.5 inches to approximately 2 inches, approximately 0.5 inches to approximately 1.5 inches, approximately 0.5 inches to approximately 1 inch, approximately 1 inch to approximately 3 inches, approximately 1 inch to approximately 2.5 inches, approximately 1 inch to approximately 2 inches, approximately 1 inch to approximately 1.5 inches, approximately 1.5 inches to approximately 3 inches, approximately 1.5 inches to approximately 2.5 inches, approximately 1.5 inches to approximately 2 inches, approximately 2 inches to approximately 3 inches, approximately 2 inches to approximately 2.5 inches, approximately 2.5 inches to approximately 3 inches.

Referring to FIG. 4, a side view of first ring attachment 200 is depicted according to an exemplary embodiment of the present invention. Thickness t of anchor 210 is of any thickness accommodatable by a space it occupies between mobile device case 130 and mobile device 190 when assembled to provide mobile device assembly 100. As shown in FIGS. 2-6, anchor 210 is substantially flat in order to fit between mobile device case 130 and mobile device 190 when mobile device assembly 100 is assembled. In some embodiments, the thickness t of anchor 210 is variable and allows for compression during assembly to provide mobile device assembly 100. In embodiments, thickness t ranges between approximately 1 mm to approximately 5 mm, approximately 1 mm to approximately 4 mm, approximately 1 mm to approximately 3 mm, approximately 1 mm to approximately 2 mm, approximately 2 mm to approximately 5 mm, approximately 2 mm to approximately 4 mm, approximately 2 mm to approximately 3 mm, approximately 3 mm to approximately 5 mm, approximately 3 mm to approximately 4 mm, and approximately 4 mm to approximately 5 mm.

In principle, diameter d of ring 110 is any distance that allows the user to securely hold mobile device assembly 100 when the user's finger engages ring 110. As described supra, diameter d may be varied to customize a fit for a given user's fingers. In embodiments, diameter d ranges between approximately 1 cm to approximately 3 cm, approximately 1 cm to approximately 2.5 cm, approximately 1 cm to approximately 2 cm, approximately 1 cm to approximately 1.5 cm, approximately 1.5 cm to approximately 3 cm, approximately 1.5 cm to approximately 2.5 cm, approximately 1.5 cm to approximately 2 cm, approximately 2 cm to approximately 3 cm, approximately 2 cm to approximately 2.5 cm, and approximately 2.5 cm to approximately 3 cm.

Figure 5:
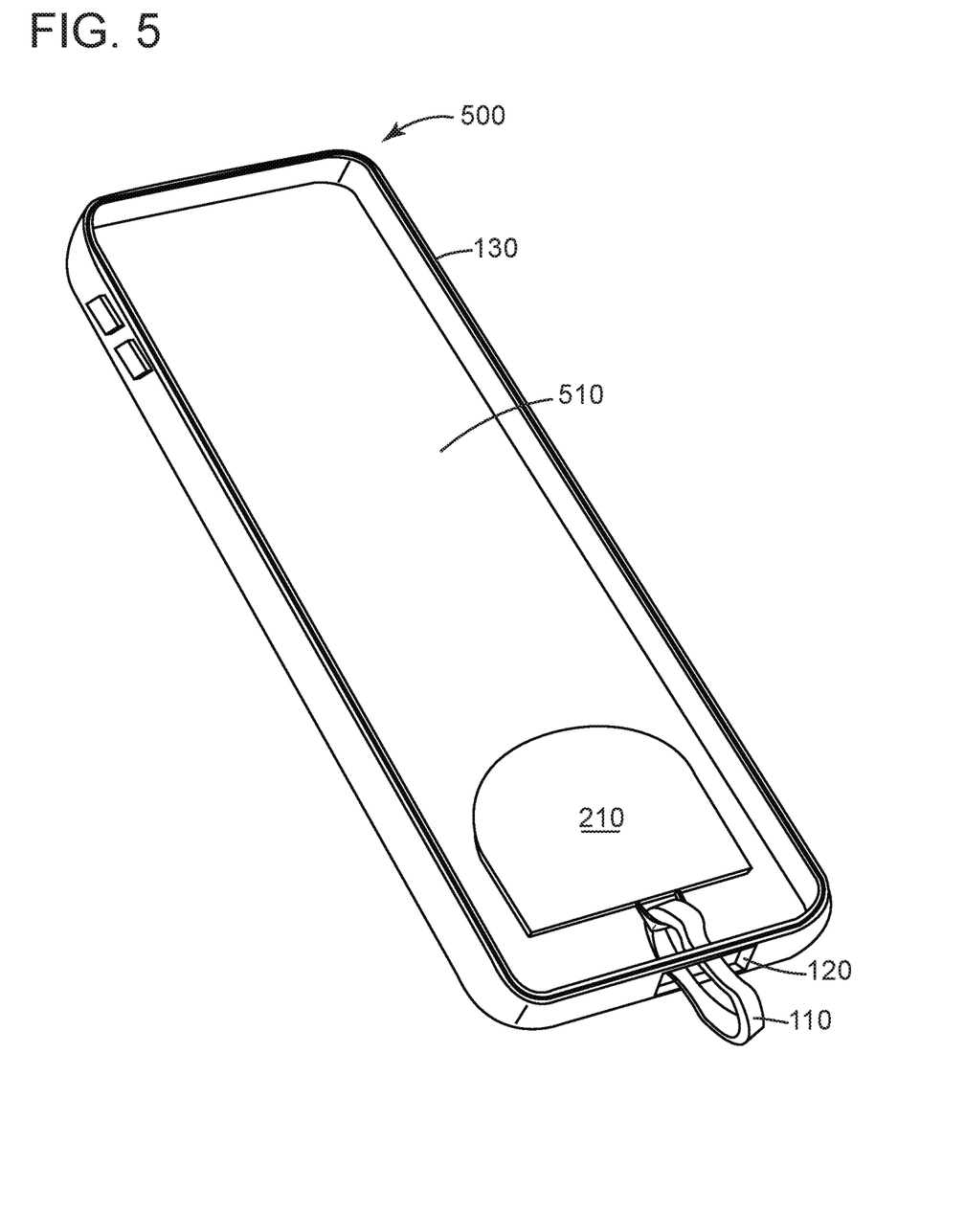
FIG. 5 depicts a perspective view of the first mobile device ring attachment partially inserted into a mobile device case according to an exemplary embodiment of the present invention.

Referring to FIG. 5, a perspective view of mobile device case-first ring attachment partial assembly 500 is depicted according to an exemplary embodiment of the present invention. In this depicted partial assembly, ring 110 is comprised of a resilient material as described above thereby allowing a user to compress ring 110 so that ring 110 may pass through aperture 120. When the inner surfaces of ring 110 are completely compressed together, a distance between opposing outer surfaces of ring 110 is within a range of approximately 1 mm to approximately 10 mm. In embodiments, a distance between opposing outer surfaces of compressed ring 110 ranges between approximately 2 mm to approximately 9 mm, approximately 3 mm to approximately 8 mm, approximately 4 mm to approximately 7 mm, and approximately 5 mm to approximately 6 mm. After ring 110 has completely passed through aperture 120 (see FIG. 6), mobile device 190 may be inserted into mobile device case inner cavity 510 to provide an embodiment of mobile device assembly 100.

It is understood that the mechanism for installation of first ring attachment 200 shown in FIG. 5 is only one possible mode for assembly of mobile device assembly 100. In other embodiments, anchor 210 is flexible enough and/or small enough to traverse aperture 120. Thus, first ring attachment 200 may be attached to mobile device case 130 by sliding anchor 210 through aperture 120. Alternatively, ring 110 may be connected to anchor 210 without requiring either ring 110 or anchor 210 to pass through aperture 120. These modes of installation are particularly useful when ring 110 is made of rigid material as described supra.

Figure 6:
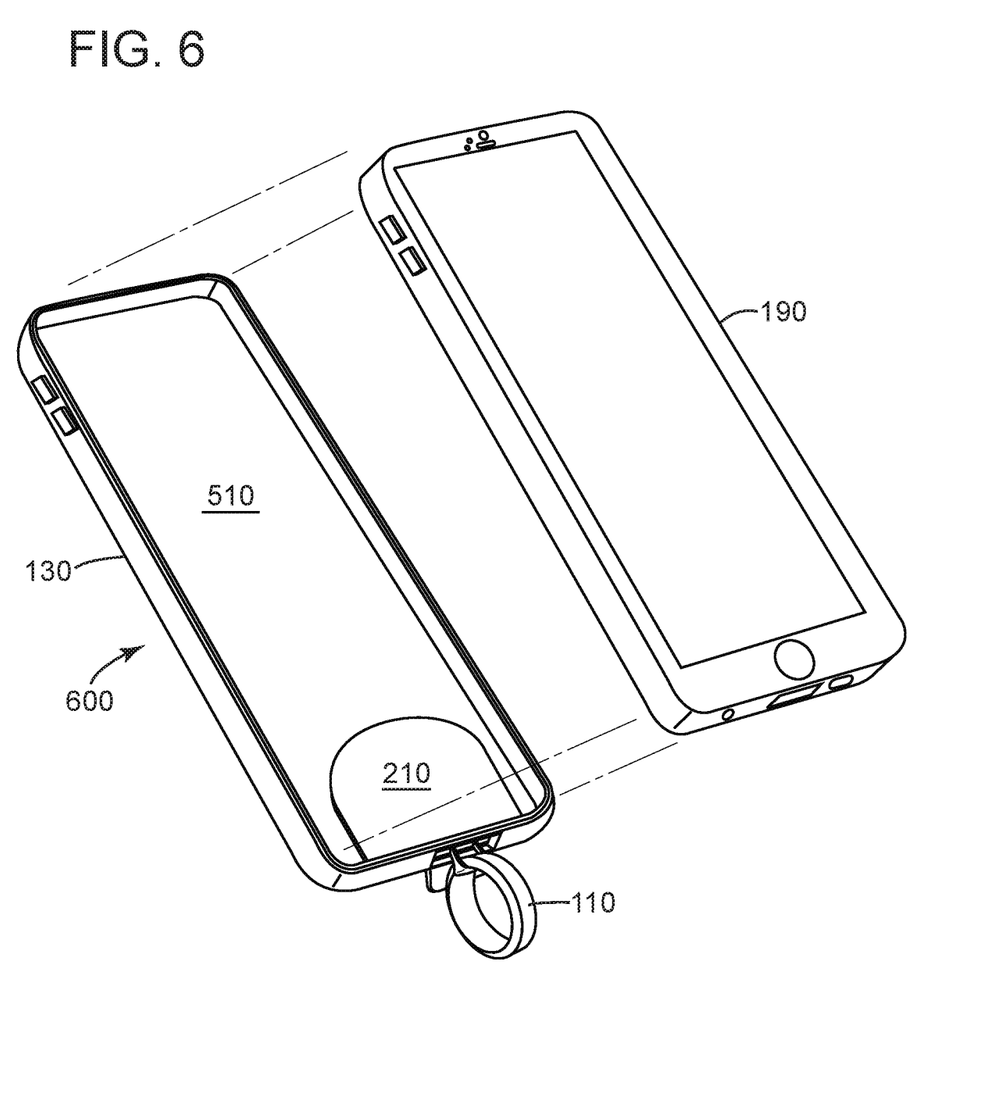
FIG. 6 depicts a perspective view of a mobile device as inserted into the mobile device case with the first mobile device ring attachment completely inserted according to an exemplary embodiment of the present invention.

Referring to FIG. 6, a perspective view of first ring attachment 200, as completely assembled into mobile device case 130 to provide mobile device case-first ring attachment complete assembly 600, is depicted according to an exemplary embodiment of the present invention. As shown, mobile device 190 is inserted into inner cavity 510. Anchor 210 is consequently secured between a back surface of mobile device 190 and inner cavity 510 of mobile device case 130 to provide, after insertion, an embodiment of mobile device assembly 100.

Figure 7:
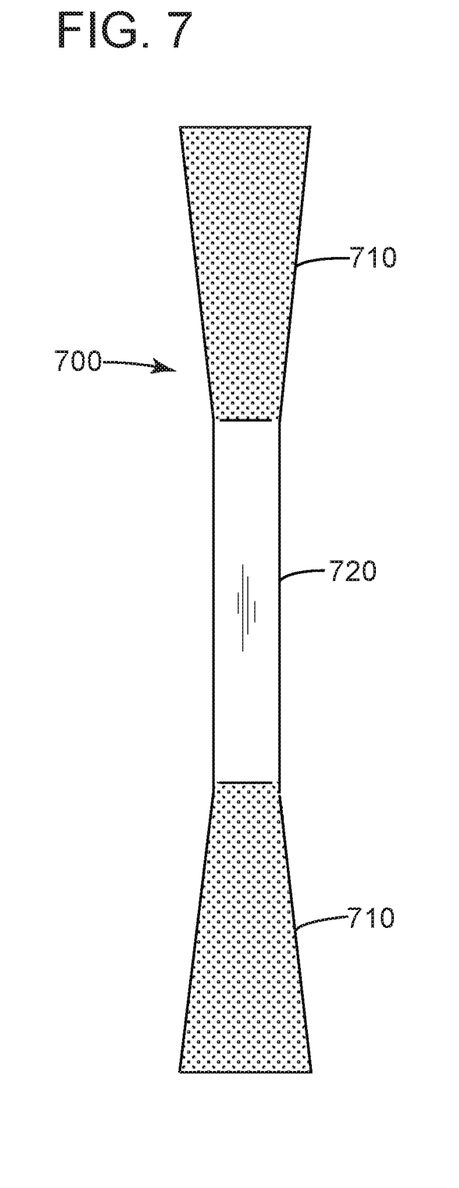
FIG. 7 depicts a top view of a precursor to a second mobile device ring attachment according to an exemplary embodiment of the present invention.

FIG. 7 depicts a top view of a precursor 700 to a second mobile device ring attachment according to an exemplary embodiment of the present invention. Precursor 700 includes a semi-soft, flexible, strong and durable strip of material that is coated on at least one of a first and second end portion (710 in FIG. 7) with an adhesive. Middle portion 720 is uncoated with adhesive. In other embodiments, first and second end portions 710 are not coated with an adhesive but are fused together as described below by other means, e.g. VELCRO.

As shown in FIG. 7, first and second end portions 710 are wedge-shaped. In some embodiments, first and second end portions 710 are of substantially similar dimensions as described above for anchor 210. In embodiments, the distance between the edges of first and second end portions 710 bordering middle portion middle portion 720 is between approximately 3 cm and approximately 10 cm, approximately 4 cm and approximately 9 cm, and approximately 5 cm and approximately 8 cm.

Figure 8:
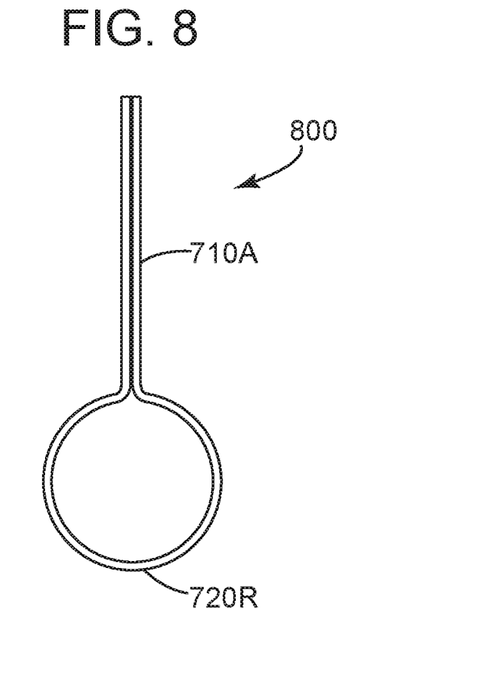
FIG. 8 depicts a side view of the second mobile device ring attachment after assembly according to an exemplary embodiment of the present invention.
Figure 9:
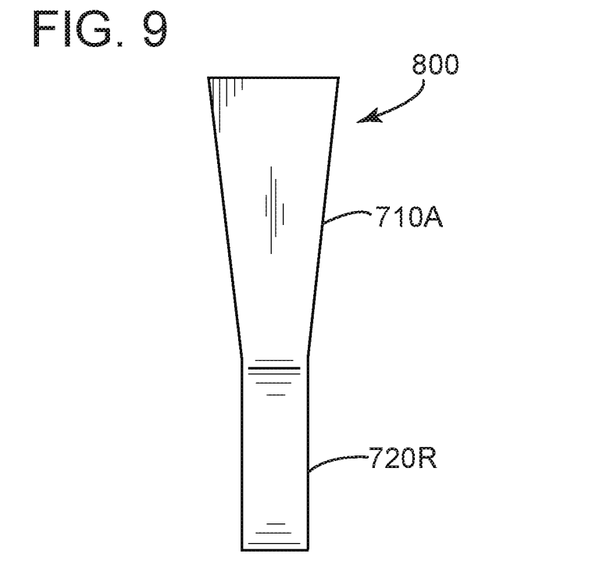
FIG. 9 depicts a side view of the second mobile device ring attachment after assembly according to an exemplary embodiment of the present invention.

FIGS. 8 and 9 depict a side view and top view of the second mobile device ring attachment 800 after assembly of precursor 700 according to an exemplary embodiment of the present invention. In this embodiment, first and second end portions 710 are adhered together to form anchor 710A and ring 720R. It should be noted that second ring attachment 800 is distinguished from first ring attachment 200 in that connector 220 is not necessary for second ring attachment 800 since ring 720R and anchor 710A are fused at the precursor 700 stage.

As shown in FIG. 9, anchor 710A is wedge-shaped. In some embodiments, anchor 710A is of substantially similar dimensions as described above for anchor 210. In embodiments, ring 720, as shown in FIG. 8, is of substantially similar dimensions as described above for ring 110.

Figure 10:
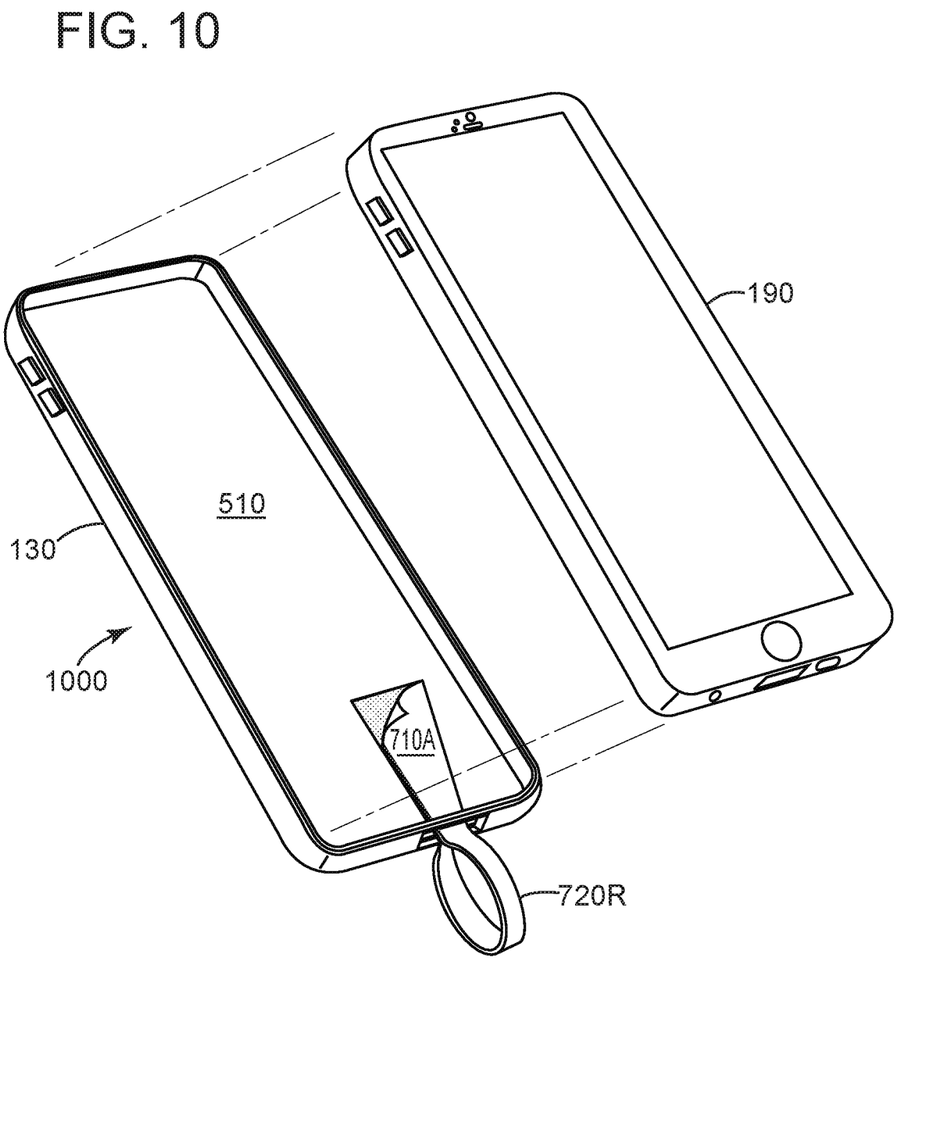
FIG. 10 depicts a perspective view of a mobile device as inserted into a mobile device case with the assembled second mobile device ring attachment inserted into a mobile device case according to an exemplary embodiment of the present invention.

FIG. 10 depicts a perspective view 1000 of mobile device 190 inserted into mobile device case 130 with the assembled second ring attachment 800 pre-inserted into mobile device case 130 according to an exemplary embodiment of the present invention. Analogously to FIG. 6, mobile device 190 is inserted into inner cavity 510. Anchor 710A is consequently secured between the back surface of mobile device 190 and the inner cavity of mobile device case 130 to provide, after insertion, a second embodiment of mobile device assembly 100.

Figure 11:
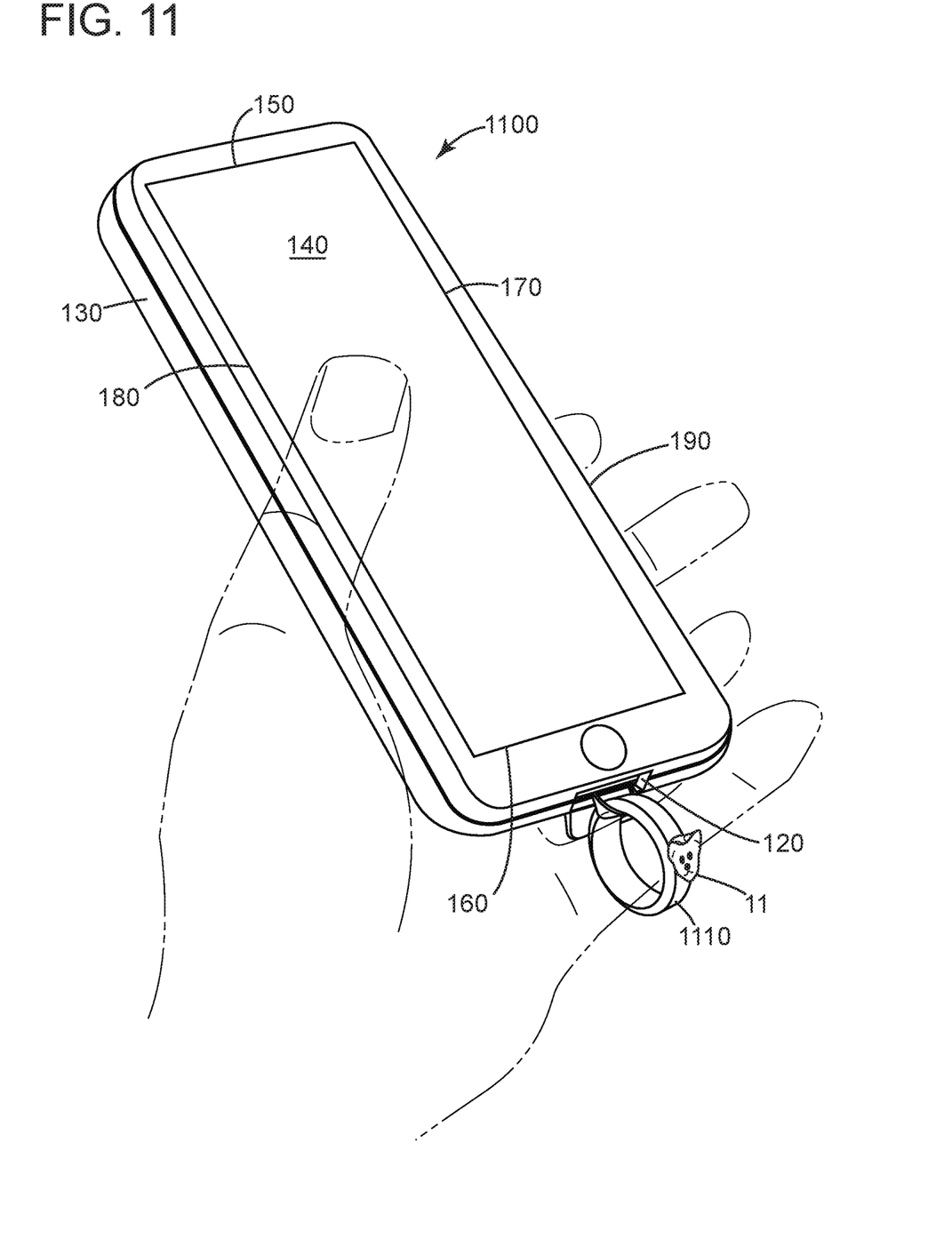
FIG. 11 depicts a perspective view of a mobile device assembly with a decorative ring ornament according to an exemplary embodiment of the present invention.

FIG. 11 depicts a perspective view of mobile device assembly 1100 with ring 1110 that includes decorative ring ornament 11 according to an exemplary embodiment of the present invention. As shown in FIG. 11, ring ornament 11 is an example of artwork that can be molded, printed, etc. onto the ring portion of both first ring attachment 200 (as shown) or second ring attachment 800 in order to personalize the ring attachments.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A ring attachment for a mobile device assembly, the mobile device assembly including a mobile device and a mobile device case, the mobile device case having sidewalls defining an inner cavity sized to receive the mobile device therein, the ring attachment comprising:
    an anchor having a height, width and thickness, wherein:
        the height and the width are sized to fit within the inner cavity, and
        the thickness is sized to fit between the inner cavity of the mobile device case and a back surface of the mobile device when the mobile device is secured within the inner cavity;
    a ring anchor connector having a first end attached to a first portion of a bottom edge of the anchor and a second end attached to a second different portion of the bottom edge of the anchor, the first and second portions being spaced apart a predetermined distance along the bottom edge, the ring anchor connector and bottom edge of the anchor forming a loop; and
    a ring that is adhesivelessly secured to the anchor via extending through the loop, wherein:
        the ring has a closed circular shape with no end or beginning,
        the ring has an inside diameter sized large enough to receive a finger of a user therethrough, and
        the ring is comprised of a resilient material such that inner surfaces of the ring may be compressed together when squeezed and the ring may return to an original shape when released;
    wherein when inner surfaces of the ring are compressed together, a distance between opposing outer surfaces of the ring is within a range of approximately 1 mm to approximately 10 mm; and
    wherein the ring is oriented substantially orthogonally to a plane of the anchor defined by the anchor's height and width when the anchor is vertically oriented and the ring is freely hanging from the loop,
    wherein the plane of the anchor bisects the ring when the anchor is vertically oriented and the ring is freely hanging from the loop,
    wherein the entire ring is configured to fit through an aperture in a bottom sidewall of the mobile device case when the ring is compressed; and
    wherein an outside diameter of the ring is larger than a length of the aperture when the ring is released.

2. The ring attachment of claim 1, wherein the height of the anchor ranges between approximately 0.5 inches to approximately 5 inches.

3. The ring attachment of claim 1, wherein the width of the anchor ranges between approximately 0.5 inches to approximately 3 inches.

4. The ring attachment of claim 1, wherein the anchor is substantially flat with a compressible thickness.

5. The ring attachment of claim 1, wherein the aperture is located at a bottom edge of the mobile device case.

6. The ring attachment of claim 1, wherein the aperture is sized to receive a charging connector for the mobile device therethrough.

7. The ring attachment of claim 1, wherein, when the ring is uncompressed, the ring is substantially circular and has an inner diameter between approximately 1 cm to approximately 3 cm.

8. The ring attachment of claim 1, wherein the ring is attached to the anchor through a loop secured to the anchor.

9. The ring attachment of claim 1, wherein the ring attachment is capable of being removed non-destructively from the mobile device-mobile device case assembly and redeployed in a second mobile device-mobile device case assembly.

10. A mobile device assembly comprising:
    a mobile device having a first bottom edge and a first top edge;
    a mobile device case having a second bottom edge and a second top edge, wherein the second bottom edge of the mobile device case aligns with the mobile device first bottom edge when the mobile device is encased in the mobile device case, and wherein the second bottom edge of the mobile device case includes an aperture; and
    a ring attachment comprising:
        a substantially circular ring adhesivelessly connected to an anchor via a ring anchor connector, the ring anchor connector having a first end attached to a first portion of a bottom edge of the anchor and a second end attached to a second different portion of the bottom edge of the anchor, the first and second portions being spaced apart a predetermined distance along the bottom edge, the ring anchor connector and the bottom edge of the anchor forming a loop through which the ring extends, wherein the anchor is sandwiched between the mobile device and the mobile device case, and wherein the connector traverses the aperture of the second bottom edge of the mobile device case, and wherein the anchor has a height, width and thickness, wherein:
            the height and the width are sized to fit within an inner cavity of the mobile device case, and
            the thickness is sized to fit between the inner cavity of the mobile device case and a back surface of the mobile device when the mobile device is secured within the inner cavity;
        the substantially circular ring is oriented substantially orthogonal to a plane of the anchor defined by the anchor's height and width, when the anchor is vertically oriented and the ring is freely hanging from the loop;

wherein the plane of the anchor bisects the ring when the anchor is vertically oriented and the ring is freely hanging from the loop, the substantially circular ring has an inside diameter sized large enough to receive a finger of a user therethrough; and the substantially circular ring has a closed circular shape with no end and no beginning;

wherein the substantially circular ring is comprised of a resilient material such that inner surfaces of the ring may be compressed together when squeezed and the ring may return to an original shape when released;

wherein when inner surfaces of the ring are compressed together, a distance between opposing outer surfaces of the ring is within a range of approximately 1 mm to approximately 10 mm;

wherein the entire ring is configured to fit through an aperture in the mobile device case when the ring is compressed; and wherein an outside diameter of the ring is larger than a length of the aperture when the ring is released.

11. The mobile device assembly of claim 10, wherein the substantially circular ring has an inner diameter between approximately 1 cm to approximately 3 cm.

12. The mobile device assembly of claim 10, wherein:
the ring fits through the aperture in the mobile device case when the aperture is compressed; and
an outside diameter of the ring is larger than a length of the aperture when the ring is released.

13. A method of attaching a ring attachment to a mobile device, the method comprising:
providing a mobile device;
providing a mobile device case, the mobile device case having sidewalls defining an inner cavity sized to receive the mobile device therein;
providing a ring attachment, the ring attachment comprising anchor, a ring anchor connector and a ring, wherein:
the anchor has a height, width and thickness, wherein the height and the width are sized to fit within the inner cavity, and the thickness is sized to fit between the inner cavity of the mobile device case and a back surface of the mobile device when the mobile device is secured within the inner cavity,
the ring anchor connector has a first end attached to a first portion of a bottom edge of the anchor and a second end attached to a second different portion of the bottom edge of the anchor, the first and second portions being spaced apart a predetermined distance along the bottom edge, the ring anchor connector and bottom edge of the anchor forming a loop,
the ring is adhesivelessly secured to the anchor via extending through the loop, wherein the ring has an inside diameter sized large enough to receive a finger of a user therethrough, the ring has a closed circular shape with no end or beginning and is comprised of a resilient material;
wherein the ring is oriented substantially orthogonally to a plane of the anchor defined by the anchor's height and width when the anchor is vertically oriented and the ring is freely hanging from the loop, and
wherein the plane of the anchor bisects the ring when the anchor is vertically oriented and the ring is freely hanging from the loop;
positioning the anchor within the inner cavity of the mobile device case;
compressing the ring such that inner surfaces of the ring are compressed together;
feeding the entire compressed ring through an aperture in a bottom edge of the mobile device case;
releasing the ring, such that the ring returns to its original shape once the ring has been fed entirely through the aperture, wherein, when the ring returns to its original shape, the outside diameter of the ring is larger than a length of the aperture when the ring is released; and
positioning the mobile device within the inner cavity of the mobile device case such that the anchor is positioned between the mobile device case and the mobile device.

14. The method of claim 13, comprising:
compressing the ring such that when inner surfaces of the ring are compressed together, a distance between opposing outer surfaces of the ring is within a range of approximately 1 mm to approximately 10 mm; and
feeding the compressed ring through the aperture such that the distance between the opposing outer surfaces of the ring fits between a top and a bottom of the aperture.

15. The method of claim 13, wherein an outside diameter of the uncompressed ring is larger than a width of the aperture through which the compressed ring is fed.

* * * * *